(12) United States Patent
Utukuri

(10) Patent No.: US 11,216,076 B2
(45) Date of Patent: Jan. 4, 2022

(54) SYSTEMS AND METHODS FOR MULTI-SCREEN INTERACTION

(71) Applicant: Vizetto Inc., Mississauga (CA)

(72) Inventor: Avanindra Utukuri, Mississauga (CA)

(73) Assignee: Vizetto Inc., Mississauga (CA)

( * ) Notice: Subject to any disclaimer, the term of this patent is extended or adjusted under 35 U.S.C. 154(b) by 0 days.

(21) Appl. No.: 17/031,908

(22) Filed: Sep. 25, 2020

(65) Prior Publication Data

US 2021/0208686 A1 Jul. 8, 2021

Related U.S. Application Data

(63) Continuation of application No. PCT/CA2019/050372, filed on Mar. 26, 2019.

(60) Provisional application No. 62/648,414, filed on Mar. 27, 2018.

(51) Int. Cl.
*G06F 3/01* (2006.01)
*G06F 17/16* (2006.01)
*G06F 3/14* (2006.01)
*H04N 21/472* (2011.01)

(52) U.S. Cl.
CPC ............ *G06F 3/017* (2013.01); *G06F 3/1423* (2013.01); *G06F 17/16* (2013.01); *H04N 21/47217* (2013.01)

(58) Field of Classification Search
None
See application file for complete search history.

(56) References Cited

U.S. PATENT DOCUMENTS

| | | | | |
|---|---|---|---|---|
| 2011/0291940 A1* | 12/2011 | Ghassabian | ........... | G06F 3/0236 345/169 |
| 2014/0078089 A1* | 3/2014 | Lee | ....................... | G06F 3/04883 345/173 |
| 2014/0320434 A1* | 10/2014 | Pantel | ................. | G06F 3/04883 345/173 |
| 2016/0026321 A1* | 1/2016 | Yeo | .......................... | G06F 3/017 345/173 |
| 2016/0188109 A1* | 6/2016 | Wang | ...................... | G06F 3/017 345/173 |
| 2017/0003795 A1* | 1/2017 | Lee | ....................... | G06F 3/04883 |
| 2017/0126879 A1* | 5/2017 | Krishna | ................ | H04M 1/724 |
| 2017/0278310 A1* | 9/2017 | Dorsey | .............. | G06F 3/04845 |
| 2018/0052576 A1* | 2/2018 | Lee | .......................... | G06F 3/167 |
| 2018/0059841 A1* | 3/2018 | Ikeda | ..................... | G06F 1/3203 |
| 2019/0145058 A1* | 5/2019 | Fritz | ..................... | E01C 19/004 701/533 |

* cited by examiner

*Primary Examiner* — Toan H Vu

(57) ABSTRACT

Various systems and methods for multi-screen interaction are described. Content and objects from a first display on a first screen may be transferred to other displays on other screens using various gestures. In some embodiments, active regions on the first display correspond to various other displays, and gestures corresponding to the active regions allow content or objects on the first display to be transferred to the other displays. In some embodiments, the content may include audio content, which may be reproduced at various audio output devices selected from the first display.

25 Claims, 14 Drawing Sheets

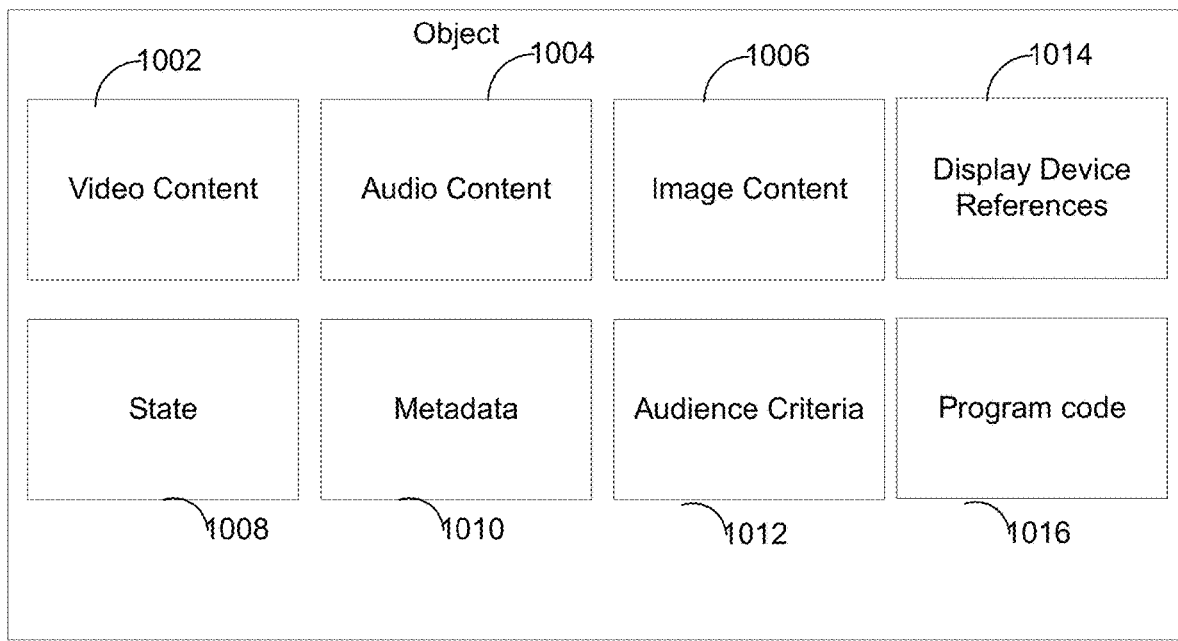

FIG. 10A

```
{
 "objectName": "Smile Image",
 "state": "alive",
 "createdDateTime": "01282018160500"
 "content": {
  "imageContent": "http://abc.com/image.png",
  "audioContent": "http://abc.com/image.mp3",
  "videoContent": "http://abc.com/image.mpeg",
  },
  "metadata": {
    "mass":"1",
    "height":"1",
    "width":"1"
  }
  "audienceCriteria":{
    "k12":{
       "imageContent": "http://abc.com/image1.png",
       "audioContent": "http://abc.com/image1.mp3",
       "videoContent": "http://abc.com/image1.mpeg",
    }
    "postsecondary":{
       "imageContent": "http://abc.com/image2.png",
       "audioContent": "http://abc.com/image2.mp3",
       "videoContent": "http://abc.com/image2.mpeg",
    }
  }
}
```

FIG. 10B

SYSTEMS AND METHODS FOR MULTI-SCREEN INTERACTION

FIELD

The described embodiments relate to systems and methods for multi-screen interaction, and in particular, for interacting with media objects and transferring media objects between a plurality of display devices.

BACKGROUND

Computing systems, including presentation and other systems having multiple screen and other output devices are well known. The arrangement of content between displays on different screens is generally cumbersome, time consuming and inconvenient. There is a need for convenient and intuitive methods for arranging content on different displays across multiple screens and other output devices coupled to a computing system.

SUMMARY

In a first aspect, some embodiments of the invention provide a method of multi-display interaction comprising: providing a plurality of display devices comprising: a display, an input device, a processor, and a memory; showing an object on a first display associated with a first display device; receiving an input gesture beginning at a first point on the object and finishing at a second point; determining a line between the first point and the second point; if a projection of the line intersects a first active region in a plurality of active regions, translating the object to the first active region and associating the object with a second display device corresponding to the first active region and showing the object on the second display; and otherwise, translating the object along the projection of the line.

In some embodiments, the method may further comprise: determining an input velocity vector between the first point and a second point and translating the object based on the input velocity vector.

In some embodiments, the method may further comprise: determining an input acceleration vector between the first point and a second point and translating the object based on the input acceleration vector.

In some embodiments, the method may further comprise: determining an object momentum at the second point based on an object mass and velocity; translating the object in a direction of the line at the object momentum and decreasing the object momentum as the object translates.

In some embodiments, the method wherein each display device may further comprise an audio device; the object may comprise an audio content and a video content; and the showing the object may further comprise showing the video content on the display device, and playing the audio content on the audio device.

In some embodiments, the method may further comprise modifying the object associated with a first display device.

In some embodiments, the method may further comprise modifying the object associated with a second display device; receiving an second input gesture beginning at a third point on the object and finishing at a fourth point; determining a second line between the third point and the fourth point; if a projection of the second line intersects a second active region in a plurality of active regions, translating the object to the second active region and associating the object with the first display device corresponding to the second active region and showing the object on the first display; and otherwise, translating the object in a direction of the second line.

In some embodiments, the method may further comprise an interaction field associated with the object comprising a plurality of options; receiving a second input gesture corresponding to a selection in the plurality of options; modifying the interaction field based on the selection; and associating the object with the first display device.

In some embodiments, the method wherein the first display device may comprise a first audience information, the second display device may comprise a second audience information, the object may comprise a first audience content and a second audience content, the showing the object may further comprise showing the first audience content on the first display based on the first audience information; showing the second audience content on the second display based on the second audience information.

In a second aspect, some embodiments of the invention provide a multi-screen interaction system comprising: an object; a plurality of display devices, each display device comprising: a memory storing the object, a display, a processor, and an input device that receives an input gesture; wherein a display of a first display device shows the object, the processor of a first display device is configured to: receive a plurality of points from the input device corresponding to gesture at a point on the display: a first point in the plurality of points corresponding to an initiation of a gesture, a second point in the plurality of points corresponding to an completion of a gesture, determine a line formed from the first point to the second point, determine a projection of the line, determine if the projection intersects a first active region in a plurality of active regions, translate the object to the first active region and send the object to a second display device corresponding to the first active region and otherwise, translate the object along the projection on the display of the first display device; the processor of a second display device is configured to: receive the object from the first display device; and store the object in the memory of the second display device; and instruct the display of the second display device to show the object.

In some embodiments, the system may further comprise: each of the plurality of display devices further comprising an audio device; the object further comprising a video content and an audio content; the processor of each of the plurality of display devices further configured to: show the video content on the display; play the audio content on the audio device.

In some embodiments, the system may further comprise: the processor of a first display device in the plurality of display devices further configured to: modify the object.

In some embodiments, the system may further comprise: the processor of a second display device in the plurality of display devices further configured to: modify the object.

In some embodiments, the system may further comprise: the processor of a second display device in the plurality of display devices further configured to: send the object to the first display device; the processor of a first display device in the plurality of display devices further configured to: receive the object from the second display device.

In a third aspect, some embodiments of the invention provide a method of transferring an object from a first display device to a second display device of a multi-screen interaction system comprising: providing a first display device and a second display device; showing an object on the first display device; receiving an input gesture comprising a translation vector at the object; determining a projection of the translation vector; translating the object on the first display device based on the translation vector; detecting an intersection of the object with a first active region on the first display device; transferring the object from the first display device to the second display device associated with the first active region.

In some embodiments, the translation vector may further comprise an input velocity vector and the determining a projection of the translation vector may further comprise determining a translation velocity vector.

In some embodiments, the translation vector may further comprise an input acceleration vector and the determining a projection of the translation vector may further comprise determining a translation acceleration vector.

In some embodiments, the method may further comprise: determining the momentum of the object; translating the object based on the momentum and decreasing the object momentum as the object translates.

In some embodiments, the method may further comprise: the object further comprising: an audio content and a video content; the first display device and the second display device further comprising an audio device; the showing the object further comprises showing the video content and playing the audio content on the audio device of the display device; the transferring the object from the first display device to the second display device further comprises transferring the playing of the audio content from the first display device to the second display device.

In some embodiments, the method may further comprise: the object further comprising a state.

In some embodiments, the method may further comprise: the first display device and the second display device in network communications and the transferring the object from the first display device to the second display device further comprises serializing the object, transferring the serialized object to the second display device using the network communication, and materializing the object into memory at the second display device.

In a fourth aspect, some embodiments of the invention provide a system of transferring an object from a first display device to a second display device of a multi-screen interaction system comprising: a first display device comprising: a display, a processor, a memory, a user input device; a second display device comprising a display, a processor, a memory, a user input device; wherein the memory of the first display device comprises an object; the first display device and the second display device are in network communication; the object is shown on the display of the first user device; the processor of the first display device is operable to: determine a line projection based on a user input from the user input device; detect an intersection between the line projection and an active region; translate the object being shown on the display; serialize the object; communicate the serialized object to the second display device using the network communication; the processor of the second display device is operable to: receive the serialized object using the network communication; materialize the object from the serialized object into memory.

In some embodiments, the processor of the first display device may be further operable to: determine an input velocity vector; determine a translation velocity vector; determine an input acceleration vector; determine a translation acceleration vector; determine an object momentum; translate the object based on the translation velocity vector, the translation acceleration vector, and the object momentum.

In some embodiments the system wherein the object may further comprise an audio content and a video content; the first display device and the second display device may further comprise an audio device; the object may be shown on the first display device based on the video content; the object may be played on the audio device of the first display device based on the audio content; the serializing the object may include serializing the audio content and the video content.

In some embodiments, the system wherein the object may further comprise a state.

BRIEF DESCRIPTION OF THE DRAWINGS

The drawings, described below, are provided for purposes of illustration, and not of limitation, of the aspects and features of various examples of embodiments described herein. It will be appreciated that for simplicity and clarity of illustration, where considered appropriate, reference numerals may be repeated among the drawings to indicate corresponding or analogous elements or steps.

A preferred embodiment of the present invention will now be described in detail with reference to the drawings, in which:

FIG. 10A is a software component diagram of an object in accordance with an example embodiment;

FIG. 10B is a serialized representation of an object in accordance with an example embodiment;

DESCRIPTION OF EXEMPLARY EMBODIMENTS

The various embodiments described herein generally relate to methods (and associated systems configured to implement the methods) for multi-screen interaction with media objects.

Organizations may generally use interaction systems having multiple screens. The multi-screen interactions systems and methods disclosed herein may be used to perform presentations including marketing presentations, educational presentations including classroom lectures, or collaborative work between a plurality of users each having a display device in a plurality of display devices defined in the present invention. Presentations may refer to a series of media content items that are distributed and discussed by a single individual who functions in a role of educator, teacher, or leader.

The multi-screen interactions systems and methods disclosed herein may also be used to perform interactive or collaborative work between participants, including but not limited to interactive lectures including problem sets or quizzes for participants to work on, collaborative work by participants in editing or modifying the media content item shared between participants, or collaborative work where each participant edits or modifies their own local copy of the media content. Where a participant edits or modifies a local copy of the media content, the modifications can be stored locally or stored remotely. The modifications to media content may then be shared by a participant with the teacher, or with other participants in the multi-screen interaction system.

Figure 1:
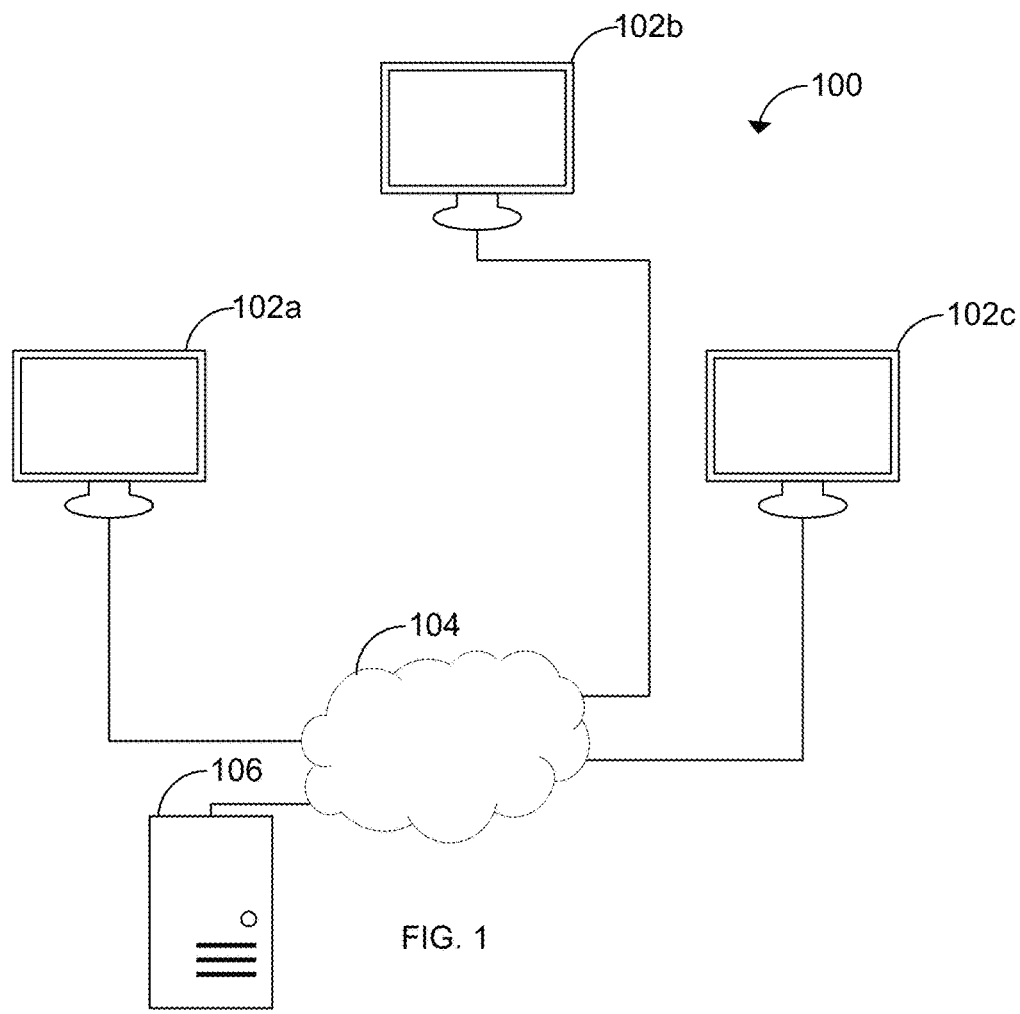
FIG. 1 is a system diagram of a plurality of display devices and a server in accordance with an example embodiment.

Reference is first made to FIG. 1, which illustrates a system diagram 100 of a plurality of display devices 102*a*, 102*b*, and 102*c*. Three display devices are shown for example, but it will be recognized that there may be as few as two display devices or a very large number (for instance hundreds or thousands) of display devices. The plurality of display devices are interconnected by network 104. Network 104 may be a TCP/IP switched network, a LAN network, a WAN network, or the Internet. The connection of the display devices to the network 104 may be provided by a connection technology such as Ethernet, Firewire, Bluetooth, Wireless (802.11 or the like), modem, or digital subscriber line connection.

Server 106 may include at least one of a database server, an application server, a content delivery network, or any other Internet based software delivery technology known in the art. Server 106 may operate database software such as MySQL, MongoDB, or Postgres. Server 106 may operate an application server such as Apache Tomcat, Glassfish, Oracle WebLogic, or the like.

System 100 may be implemented as software program code and delivered to the plurality of display devices and the server by any known means.

Figure 2:
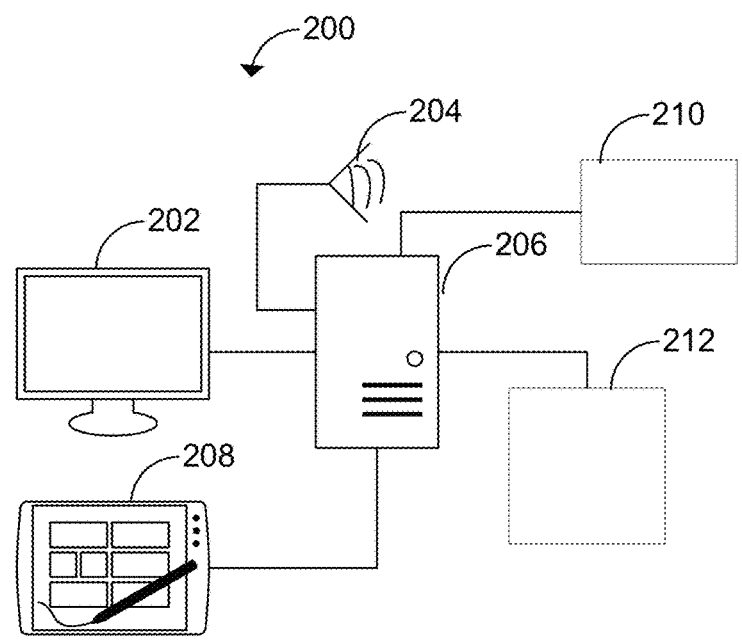
FIG. 2 is a system diagram of a display device in accordance with an example embodiment.

Reference is made to FIG. 2, which illustrates a system diagram of a display device 200. The display device 200 may have a display screen (or simply screen) 202, a speaker 204, a processor 206, an input device 208, network device 210 and memory (both volatile and non-volatile) 212. Display screen 202 may be an LCD, CRT, LED, OLED, or plasma screen. The screen 202 and the input device 208 may be combined, for example, by using a capacitive touch display system using a participants finger or fingers and optionally using a stylus. Additional descriptions of surface touch sensing systems and methods can be found in U.S. Pat. No. 9,582,116, "Systems and methods for sensing and tracking radiation blocking objects on a surface", filed Mar. 3, 2013, U.S. Pat. No. 9,453,726, "Systems and methods for sensing and tracking radiation blocking objects on a surface", filed Aug. 27, 2013, U.S. Pat. No. 9,395,185, "Modular position sensing systems and methods", filed Dec. 2, 2012, U.S. Pat. No. 8,969,822, "Two-dimensional and three-dimensional position sensing systems and sensors therefor", filed Dec. 16, 2011, U.S. Pat. No. 9,395,185, "Modular position sensing systems and methods", filed Dec. 2, 2012, U.S. Pat. No. 8,969,769, "Two-dimensional position sensing systems and sensors therefor", filed Dec. 16, 2011, U.S. Pat. No. 8,928,873, "Sensors, systems and methods for position sensing", filed Mar. 25, 2013, and U.S. Pat. No. 8,405,824, "Sensors, systems and methods for position sensing", filed Mar. 18, 2011. The screen 202 may provide the user with image content playback or video content playback. The speaker 204 connected to the processor may provide a participant with playback of audio content. Processor 206 may be any known processor, for example one using an Intelno x86 or x86_64 architecture, an ARM™ microprocessor, a Qualcomm™ Snapdragon™, or a processor provided by a virtualization environment. The input device may be a mouse, keyboard, controller, touch screen, eye focus tracking device, trackpad, motion sensing accelerometer, trackball, a microphone, or the like. The display device 200 may be a mobile device such as a mobile phone, a tablet device, a desktop computer, a laptop computer, a wearable computer such a Google™ Glass, a virtual reality device such as Sony™ Playstation VR™ or Oculus™ Rift™, or any other suitable device.

Figure 3:
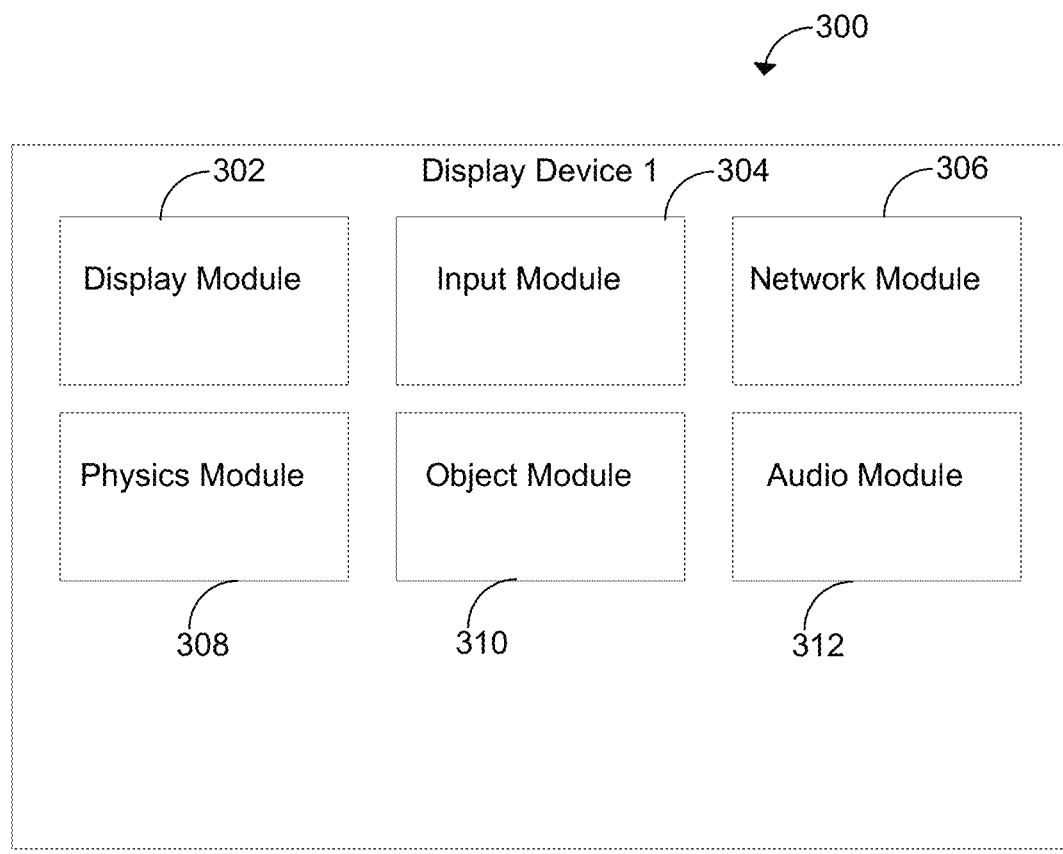
FIG. 3 is a software component diagram of a display device in accordance with an example embodiment.

Reference is made to FIG. 3, which illustrates a software component diagram of a display device. Display device 300 may have a display module 302, an input module 304, a network module 306, a physics module 308, an object module 310, and an audio module 312.

Display module 302 may be responsible for drawing a user interface that the user views, and is responsible for drawing (or rendering) the objects associated with the display device on the screen.

Input module 304 may be responsible for receiving user input from the user input devices such as a point device like a mouse, a touch sensitive screen input device such as a capacitive LCD touch screen, or verbal commands from a user received by a microphone.

Network module 306 may be responsible for communicating with other display devices or a server located remotely. The network module may be responsible for managing connections synchronously or asynchronously when a display device is associated with an media object that is linked to another object.

The physics module 308 may operate to determine vectors such as a user input vectors determined from user input, for instance the physics module may be able to determine the resultant vector of input based on a series of points input by a user input device. Other vectors may be determined, including an object translation vector based on a user input vector, an object velocity vector, or an object acceleration vector. The physics module may receive multi-dimensional input such as the input from a plurality of accelerometers in a mobile device, and determine an vector in three-dimensional space. The physics module 308 may also determine the behavior of objects while they translate, for instance to determine intersections with other objects or walls, to determine the momentum of an object on the display device, or to determine the resulting momentum of an object as it intersects another object or wall. The physics module may provide a user input vector.

The object module 310 may store object properties, edit object properties, store object metadata, edit and update object metadata. The object module may provide an application programming (API) interface for the other modules to create, read, update or delete object properties, object metadata and objects.

The audio module 312 may support the playback of audio content in objects.

Figure 4A:
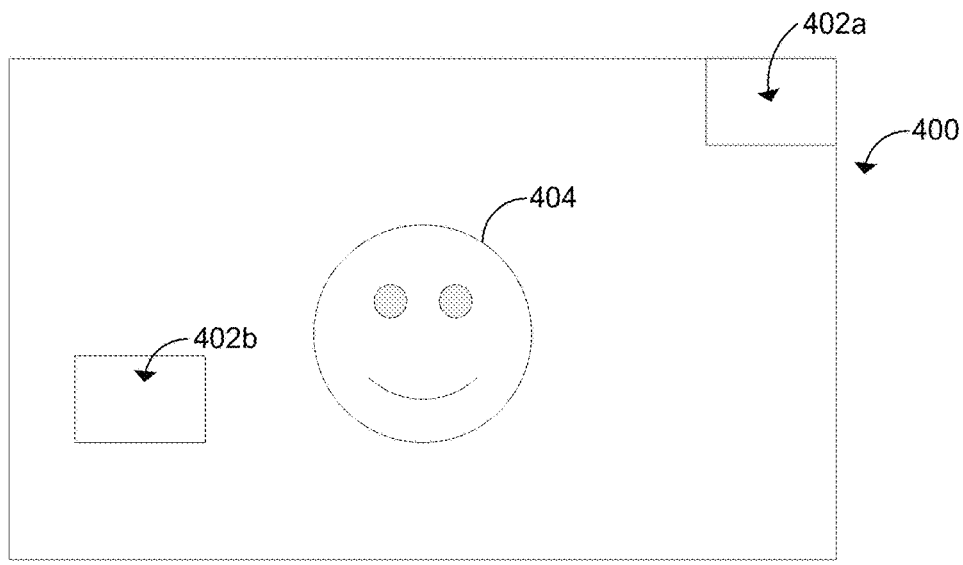
FIG. 4A is a user interface of a first display device for multi-screen interaction with an object in accordance with an example embodiment.

Referring to FIG. 4A, which illustrates a user interface 400 of a first display device for multi-screen interaction. The user interface may include a plurality of active regions 402a and 402b, and an object 404.

Active regions 402a and 402b may be configurably sized and shaped, for instance they may be square, rectangular or circular. The active regions may also be configured to While two active regions 402a and 402b are shown, there may be more than two active regions in the user interface 400. An active region may be configured by a user to specify a target display device of the region. The configuration may occur automatically based on, for instance, the location and size of the received video conferencing feed from the target display device. In an example, a group of users may have a video conference active where each user sees a video feed from each other user and each bounding box of the video feed may automatically operate as an active region on a display device that a user may "throw" an object at to send it to the display device of the targeted user.

The user interface 400 may optionally display zero objects, one object, or more than one object at once. Objects, such as object 404 are described in more detail below at FIG. 10A.

Figure 4B:
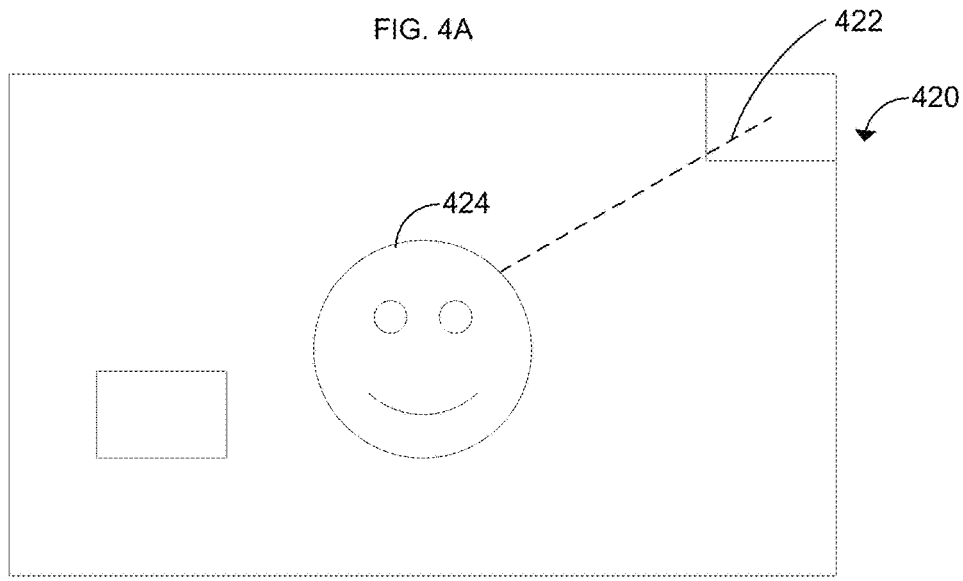
FIG. 4B is a user interface of a first display device responding to user input with an object in accordance with an example embodiment.

Referring to FIG. 4B, which illustrates a user interface 420 of a first display device that may respond to user input. A user engages an input device, and selects a first point, and then for the duration of the selection event tracks the points of input until the selection is released (further explained in FIG. 6A-6B below). If the first point is within the boundary of the object 424, then the user interface 420 will respond to the user input by translating the object.

The line determined from the user input may be used to determine a projection line 422 to the edge of the screen. The object 424 may be translated along the projection line 422.

Optionally, for the duration of the selection event the object may move to the current point of the users cursor or touch input point. In this manner the object may appear to follow the users cursor or finger input until the end of the selection event.

Figure 4C:
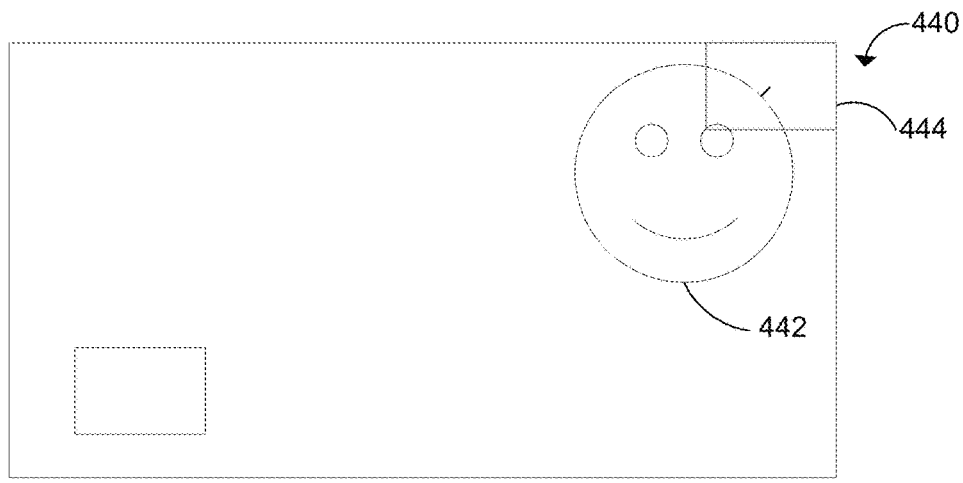
FIG. 4C is a user interface of a first display device where an object intersects with an active region in accordance with an example embodiment.

Referring to FIG. 4C, which illustrates a user interface 440 of a first display device where the object 442 representing the object in FIG. 4B translates and intersects with an active region 444 associated with a second display device. The intersection is defined by the overlap of each of the active region 444 and the object boundary 442.

Figure 4D:
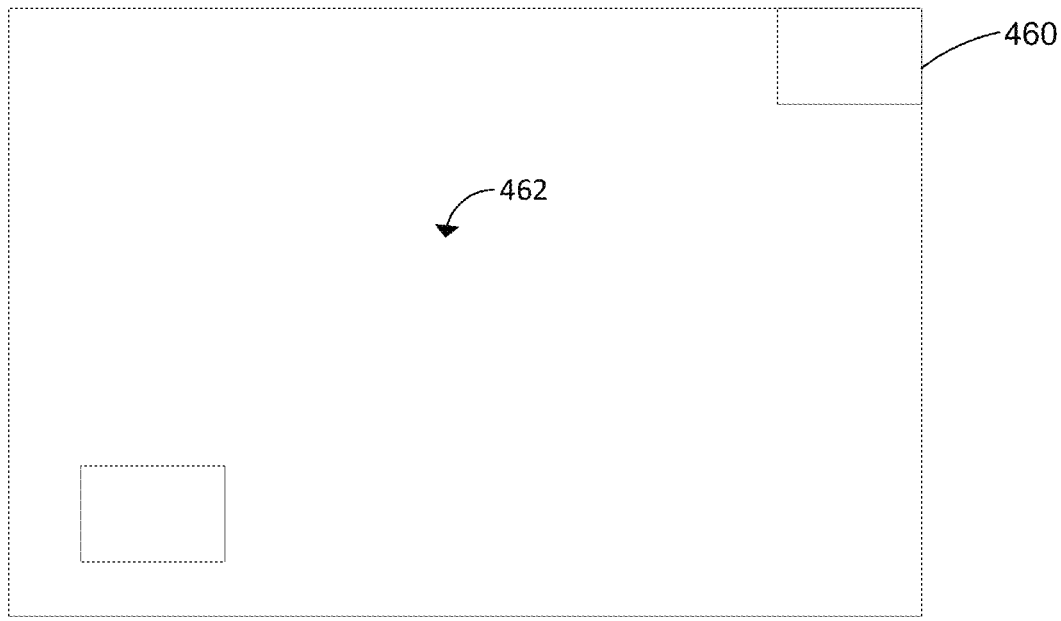
FIG. 4D is a user interface of a first display device where an object has been associated with a second display device in accordance with an example embodiment.

Referring to FIG. 4D, which illustrates a user interface 460 of a first display device where the object from FIG. 4C is no longer displayed on screen 462, having been associated with a second display device. Optionally, an object may be configured to associate with multiple display devices and may remain displayed on the first display device after the object has additionally been associated with the second display device. Such an object configuration may allow for a linked object that is displayed on a first and a second display device simultaneously and synchronously.

Figure 4E:
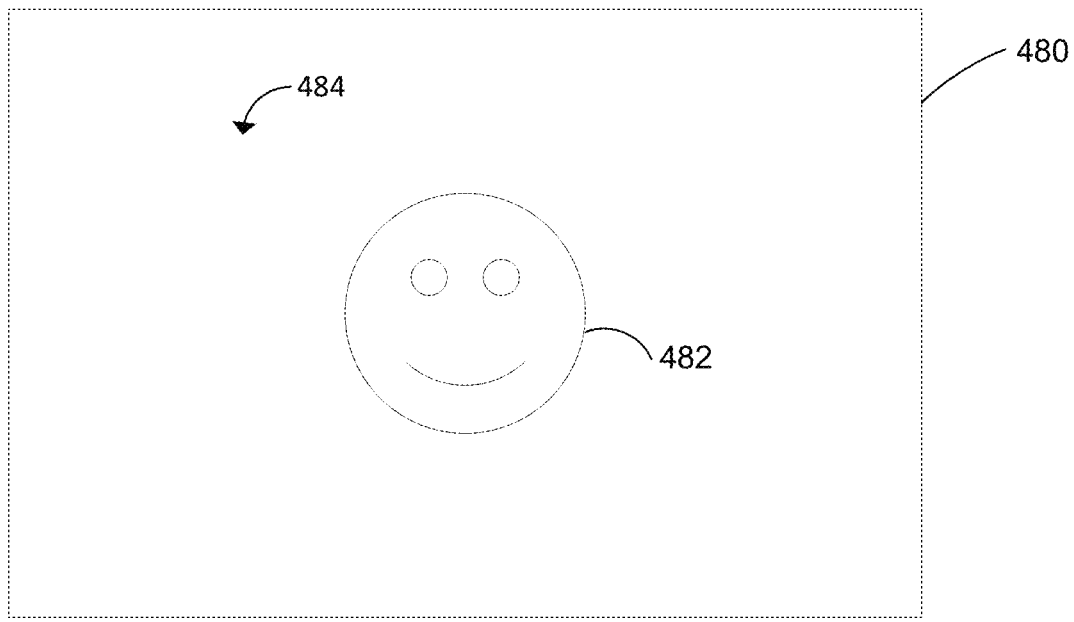
FIG. 4E is a user interface of a second display device associated with an active region of the first display device in FIG. 4C in accordance with an example embodiment.

Referring to FIG. 4E, which illustrates a user interface 480 of the second display device associated with active region 444 of FIG. 4C. The object 482 is displayed on the screen 484 of the second display device. The association of the object 482 with the second display device may trigger the playback of the content of the object 482. For example, audio content or video content may begin playback or image content may be displayed once the object is associated with the second display device.

Figure 5A:
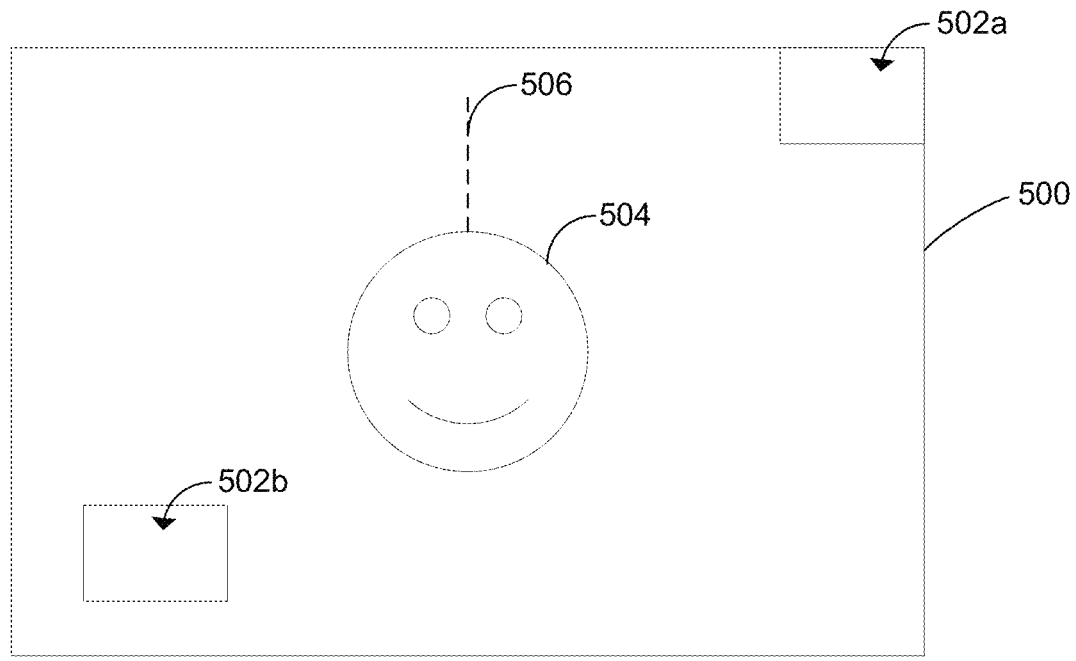
FIG. 5A is a user interface of a first display device responding to user input with an object in accordance with an example embodiment.

Referring to FIG. 5A, which illustrates a user interface 500 of the first display device. The user interface has active regions 502a and 502b, object 504, and line projection 506 based on user input. The line projection 506 in this drawing does not intersect with either active region 502a or 502b.

Figure 5B:
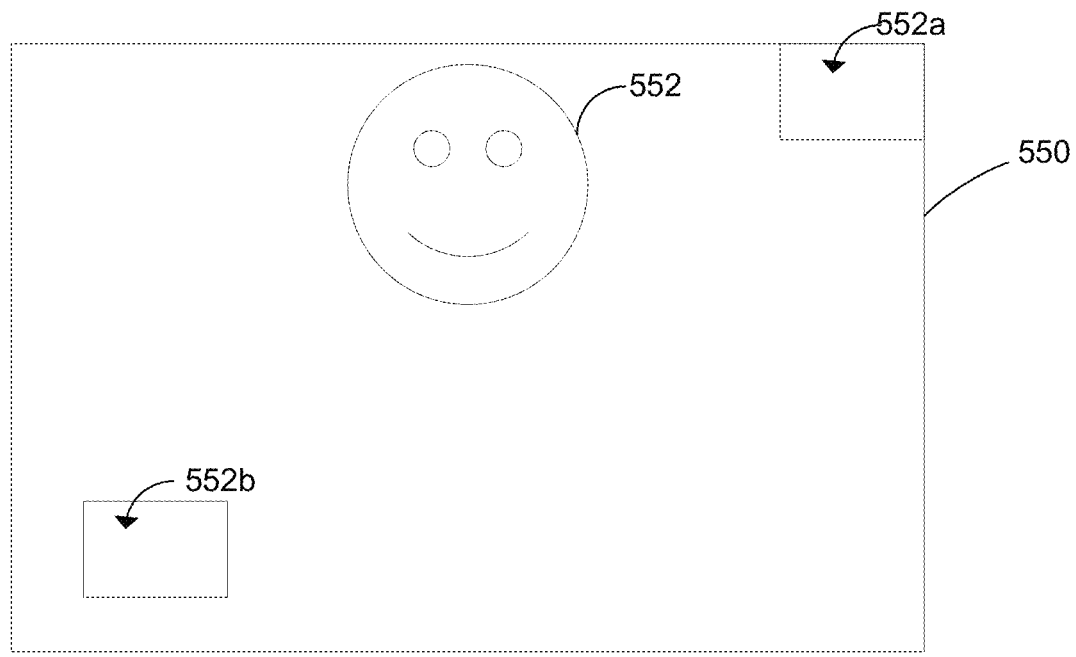
FIG. 5B is a user interface of a first display device where an object does not intersect with an active region in accordance with an example embodiment.

Referring to FIG. 5B, which illustrates a user interface 550 of the first display device where object 552 has been translated and does not intersect with the active regions 552a or 552b.

Figure 6A:
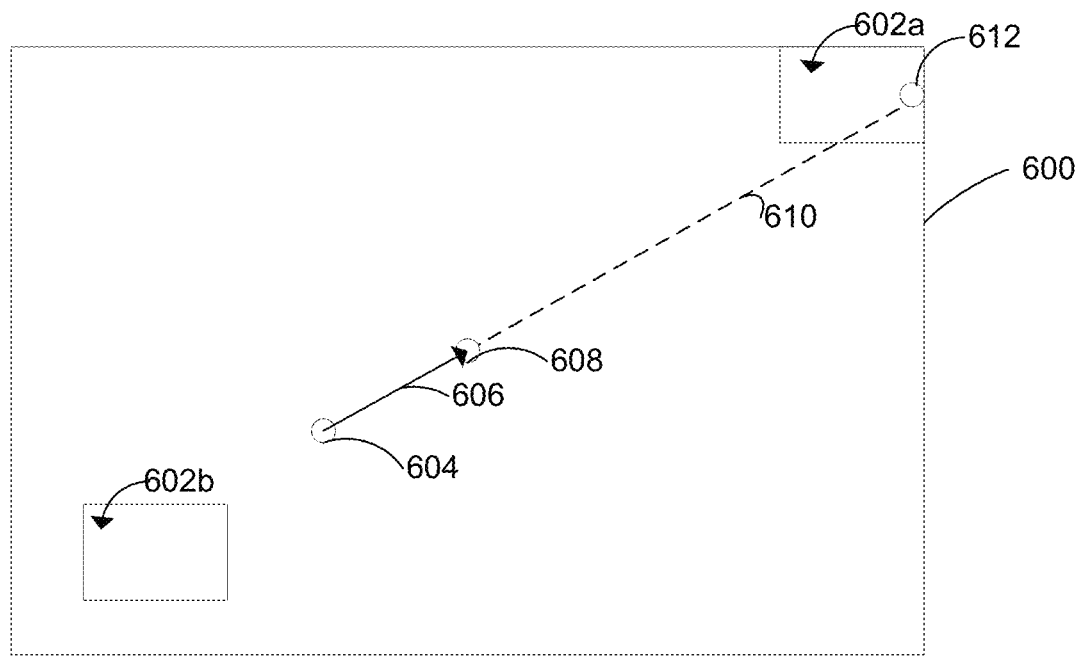
FIG. 6A is a user interface of a first display device for touch interaction in accordance with an example embodiment.
Figure 6B:
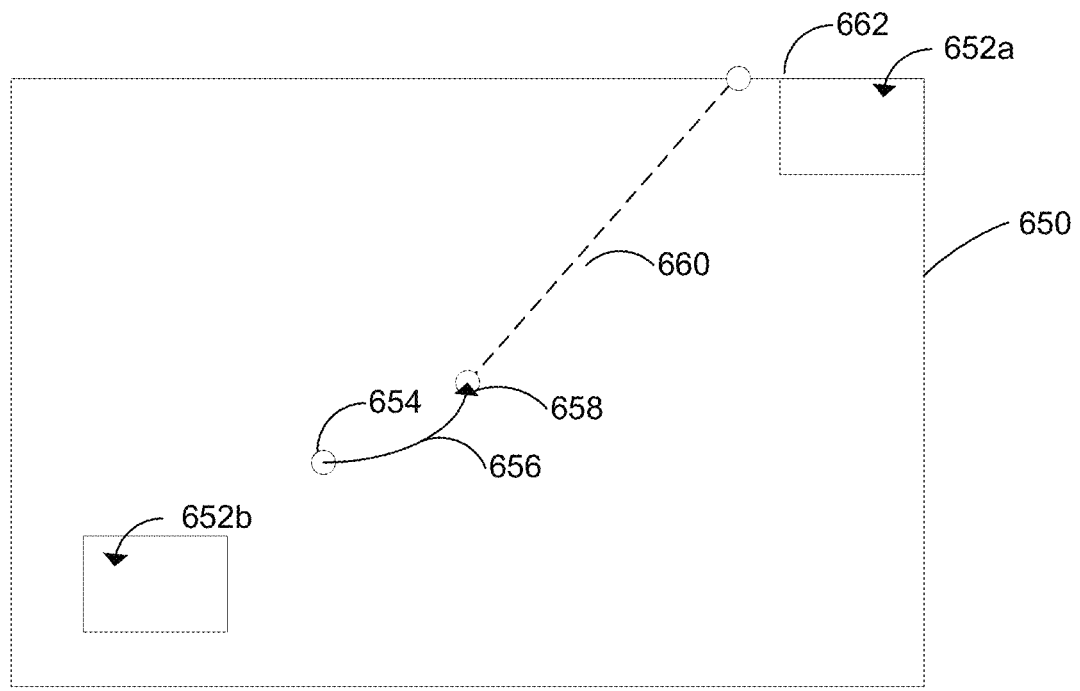
FIG. 6B is a user interface of a first display device for touch interaction in accordance with an example embodiment.

Referring to FIGS. 6A and 6B, which illustrates a user interface 600 responsive to a user input selection. The selection may begin based on a user input event at a first point, for example a "mouse-down" when a user depresses a button on a mouse, a button on a keyboard, or when a user applies their finger to a touch interface. The second point that may complete the series of points may be based on a user input event, for example a "mouse-up" when a user releases a button on a mouse, when a user removes their finger or a stylus from a touch interface.

Optionally, a selection line 606,656 includes the first point and the second in the Optionally, a selection line 606,656 includes a series of points beginning at the first point 604,654 and ending at the second point 608,658. This selection line from the first to second points that may be substantially straight 606, or may be curved 656.

Optionally, after the "mouse-down" but before the "mouse-up" event the object may translate according to the most recent cursor point, or touch point if a touch interface is used. In this way the object may follow the users finger or cursor along the selection line 606, 656.

The projection line may form a straight projection line (also referred to herein as a projection vector or translation vector) 610,660 formed by a linear regression of the series of points in the selection line 606, 656. The projection line may begin at the second point of the selection line. The projection line 610, 660 ends at a point on the edge of the display device screen 612, 662. FIG. 6A shows the projection line 610 intersecting with active region 602a. FIG. 6B shows the projection line 660 not intersecting with active region 652a.

Optionally, the projection line may be a curved projection line (also referred to herein as a translation vector). In this case, the regression may be polynomial, exponential, logarithmic or any other mathematical model used to perform such fitting.

Optionally, based on the selection line 606,656 an input velocity vector may be determined by finding a first derivative of the selection line. The translation of an object along the translation vector may be based on the input velocity vector. For example, based on a user's input, the object may travel at a proportional velocity to the velocity of user input along the selection line.

Optionally, based on the selection line 606,656 an input acceleration vector may be determined by finding a second derivative of the selection line. The translation of an object along the translation vector may be based on the input acceleration vector. For example, based on a user's input, the object may travel at a proportional acceleration to the velocity of user input along the selection line.

Figure 7:
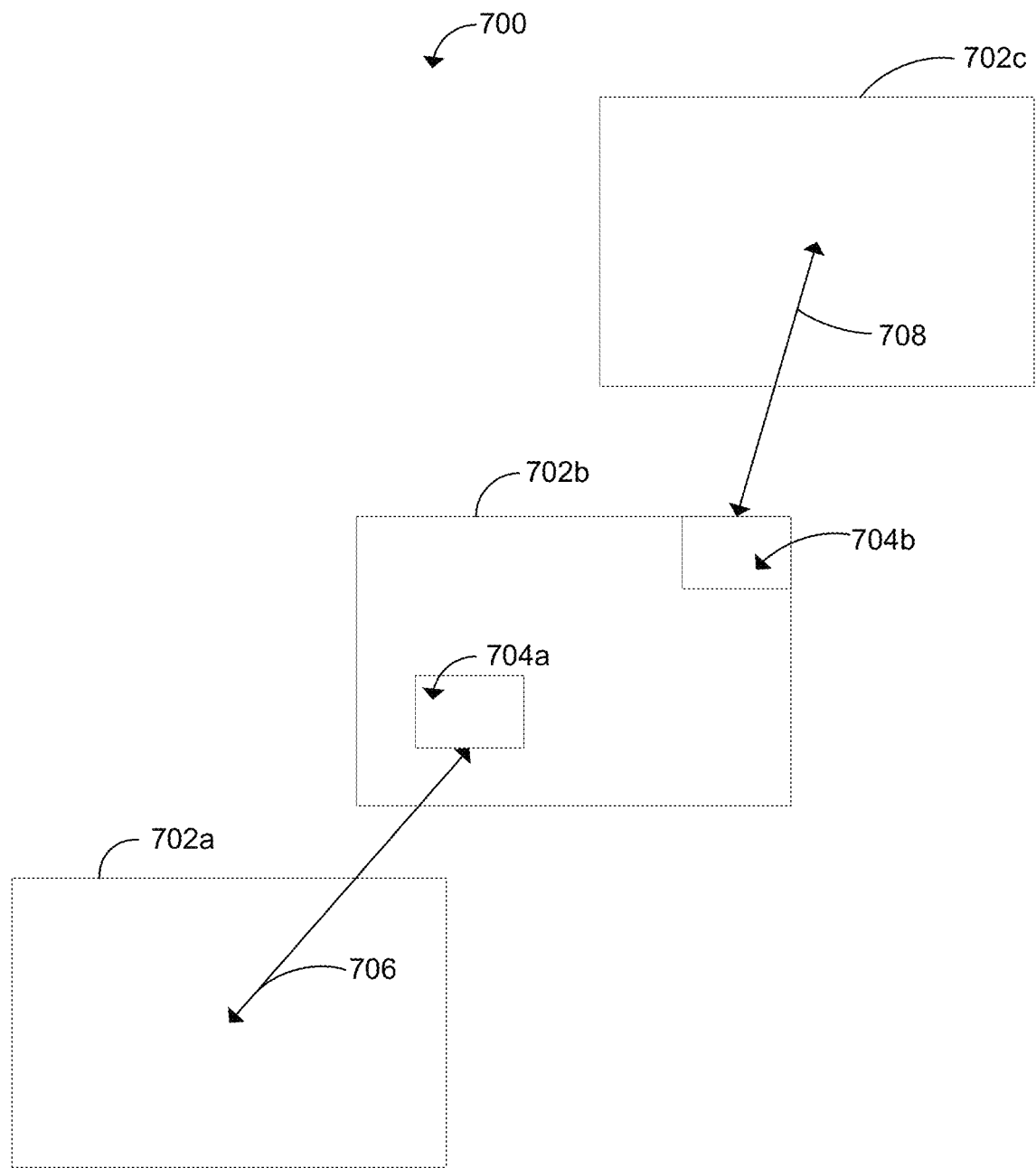
FIG. 7 is a system diagram for transferring an object from a first display device to a second display device in accordance with an example embodiment.

Referring to FIG. 7, which illustrates a system 700 for transferring an object from a first display device to a second display device. System 700 includes three display devices 702a, 702b, and 702c, and two active regions 704a and 704b on the display device 702b. There may be as few as two display devices, but there may be many more than the three pictured, perhaps even hundreds or thousands. The active region 704a is associated with display device 702a and the active region 704b is associated with display device 702c. An object (not shown) that is associated with display device 702b may be transferred to display device 702a by providing user input that translates the object onto active region 704a. Similarly, an object that is associated with display device 702b may be transferred to a display device 702c by providing user input that translates the object onto active region 704b.

Figure 8:
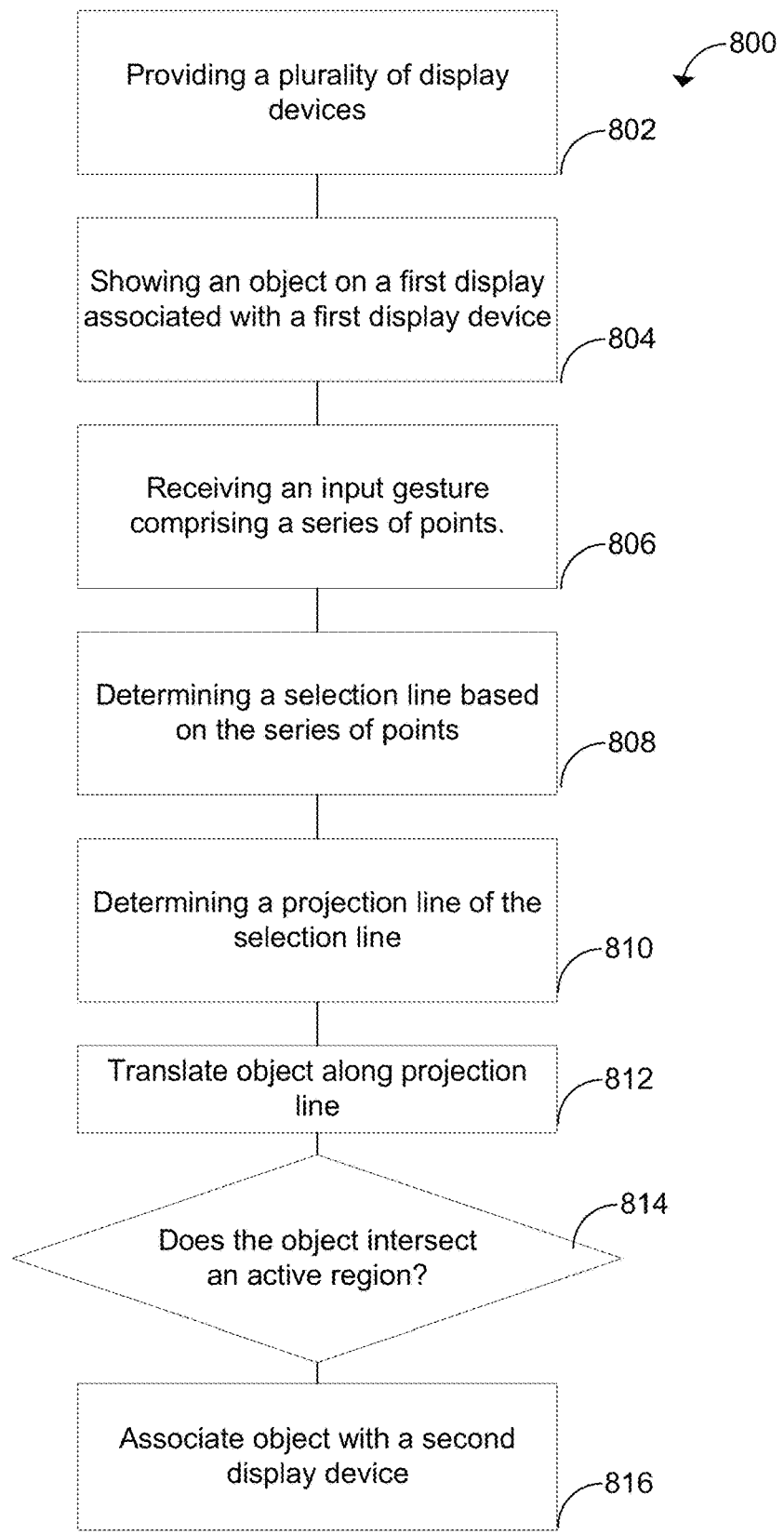
FIG. 8 is a flow diagram illustrating a method of multi-screen interaction on a display device in accordance with an example embodiment.

Referring to FIG. 8, which illustrates a flow diagram 800 illustrating a method of multi-screen interaction on a display device. At 802, a plurality of display devices are provided as disclosed herein. The display devices may be provided in a single classroom, multiple classrooms, or even multiple classrooms that are geographically distributed. The users of the display devices may include teachers, students, managers, executives, employees, or any individual interacting with another.

At 804, an object is shown on a first display associated with a first device. The object may be created by a user, received from another user, automatically created, provided by a remote server, etc. The object is displayed on the screen of a first display device. The object may have content as described herein, and the display of an object on a display device may involve the display of an image, the playback of a video, the playback of audio, or media playback as appropriate for the content. The playback may begin automatically.

At 806, the display device receives user input constituting a series of points including a first point representing the start of a selection line. The first point may correspond to a "mouse-down" event where a mouse button is depressed or on a touch interface where the users finger or stylus begins contact with a surface. The series of points may further include a second point corresponding to a "mouse-up" event where a mouse button is released or on a touch interface where the users finger or stylus finishes contact with a surface. The input gesture may comprise a selection line that is a substantially straight line or the selection line may be a curved line. The selection line is described in more detail above in FIGS. 6A-6B.

Optionally, the object may translate after the "mouse-down" event and before the "mouse-up" event to follow the users cursor or finger/stylus along the selection line.

At 808 a selection line (or selection vector) may be determined between the first and second points of the series of points. This may approximate the selection line based on these two points.

Optionally, the selection line determined at 808 may simply be the series of points received from the user's input gesture.

At 810, a projection line (or projection vector) may be determined based on the selection line. The determination of the projection line is discussed in more detail above in FIGS. 6A-6B. The projection line may be determined based only on the first point and the second point. The projection line may be determined based on the series of points, and may be determined based on a regression of the points Optionally, 806-814 may apply iteratively for each point in the series of points after the "mouse-down" event and before the "mouse-up" event.

At 812, an object is translated along the projection line. The object is displayed at a point having an x and a y coordinate. The translation may involve iteratively changing object display point to consecutive points on the projection line, and updating the display of the object as the translation occurs.

This translation may be animated and the object may substantially smoothly translate across the screen. Optionally, the translation may not be animated and the object may simply disappear and reappear with the translation being invisible upon the screen.

The translation may be analogized to "throwing" the object at different regions of the screen, including an active region.

At 814, the location and dimensions of the object are used to determine if there is an intersection between the object and an active region. An intersection is define as an overlap of a region of the object with the active region. If there is no intersection, the translation of the object may continue.

At 816, in the case that there is an intersection of the object with an active region, the object may be associated with a second display device. This association may involve updating the object metadata to specify a new reference to the second display device. This may be accomplished by the object tracking a reference to a display device id that uniquely identifies the display device.

Optionally, the association may instead refer to an association at the display device referencing an object. This may be accomplished by the display device tracking a reference to an object id that uniquely identifies the object.

Optionally, the object may have a reference to the display device id and the display device may have a reference to the object id. The display device id uniquely identifying the associated display device, and the object id uniquely identifying the object.

Optionally, the object may be serialized (that is, the object in the memory of the first display device is translated into a text or binary string formatted such that it's state preserved). Upon receipt of the serialized object by the second display device the object may be materialized (that is, translated from a text or binary string into the memory of the second display device such that it's state is preserved).

Optionally, an API call may be made to the server to trigger the association of the object with the second display device.

Optionally, in the case where the object intersects the edge of the screen, or another the display device may alter the objects direction and "bounce". In the case that two objects intersect, the objects may determine the resulting direction and speed based on the calculated momentum of each object and a conservation of momentum basis for the collision.

Figure 9:
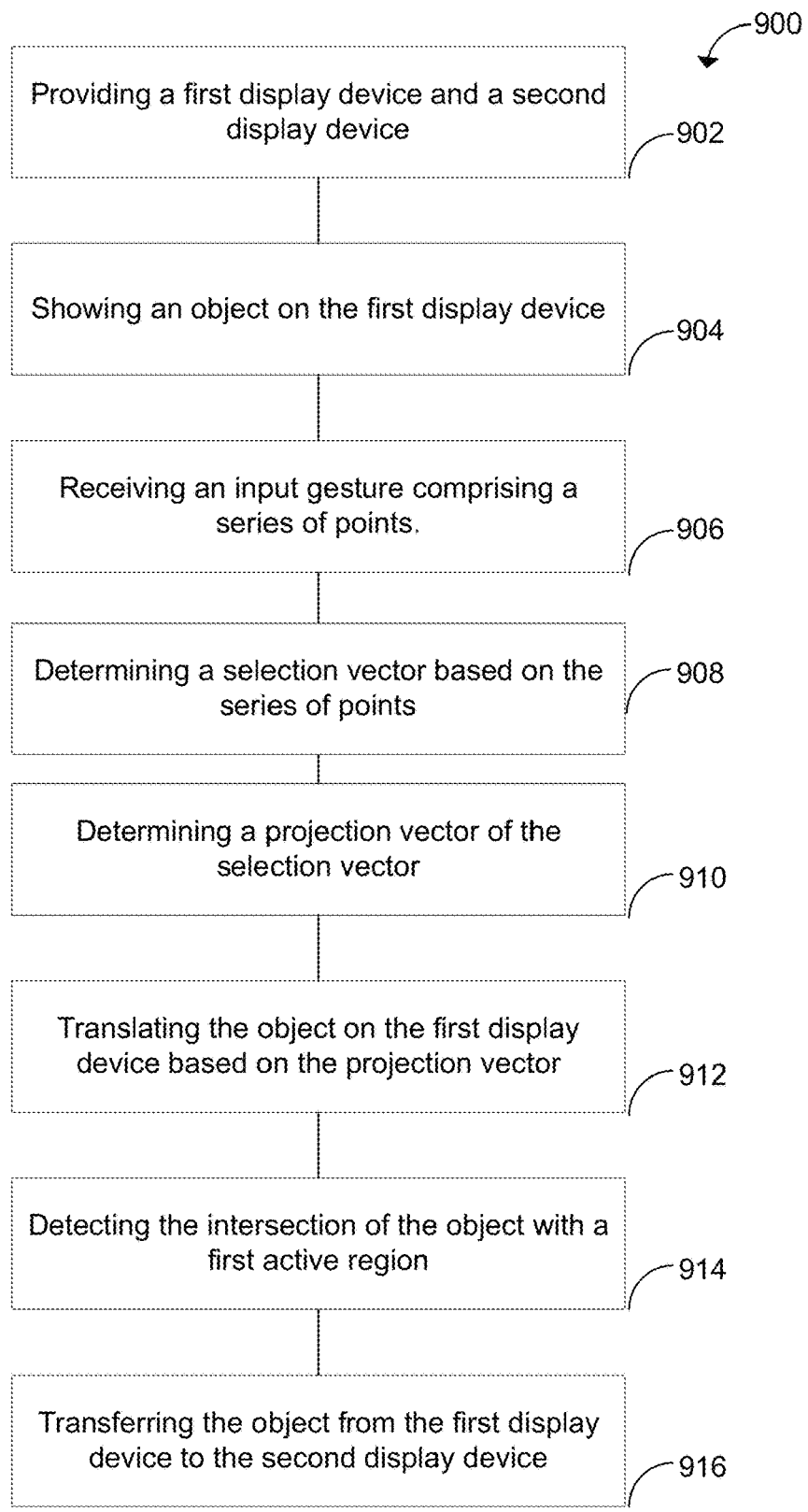
FIG. 9 is a flow diagram illustrating a method for transferring an object from a first display device to a second display device in accordance with an example embodiment.

Referring to FIG. 9, which illustrates a flow diagram 900 for a method for transferring an object from a first display device to a second display device. The method disclosed in 900 is operable to transfer an object having content from one display device to another.

At 902, a first display device and a second display device are provided. These display devices may be co-located in a boardroom or a classroom and used by two or more people, or may be distributed to more than one location with at least two users.

At 904, an object is displayed on the first display device. The object may involve media including audio, video or image content as disclosed herein. The displaying or showing the object may mean initiating a playback of the media.

At 906, the object that is displayed receives a user input gesture that includes a series of points, the first point being within the object on the display. The object is responsive to the user input actions. The steps 906-914 may be performed iteratively as the user draws the selection line.

At 908, the object may determine a selection vector based on the series of points from the user input gesture. This selection vector, as disclosed herein, may be a first point and a second point, the first point representing the beginning of user input and the second point representing the end of user input. The selection vector may alternatively be the first point, the second point and the series of points, and may be substantially straight or curved.

At 910, the object may determine projection vector of the selection vector. As described in FIGS. 6A-6B, the projection may be based on a linear regression of the series of points.

At 912, the object may translate on the first display device based on the projection vector. This translation may involve moving the object's point (based on x and y coordinates) to consecutive points on the projection line.

At 914, the object may detect if there has been an intersection of the object on the screen with an active region. This intersection is defined as the overlap of a region of the object with an active region. In the case where the object intersects the edge of the screen, or another object it may alter its direction and "bounce". In the case that two objects intersect, the objects may determine the resulting direction and speed based on the calculated momentum of each object and a conservation of momentum basis for the collision.

At 916, if the object intersects the active region, the object may transfer to a second display device associated with the active region. This may involve a transfer over the network of a serialized copy of the object, and a materialization at the second display device.

Optionally the transfer may involve a server initiating a transfer of the object to the second display device.

Referring to FIG. 10A, is a software component diagram 1000 of an object. Objects may have content (also referred to herein as media) including video content 1002, audio content 1004, image content 1006, object metadata 1010 (also referred to herein as properties or object properties), audience criteria 1012, state 1008, an association (or references) with one or more display devices 1014, and program code 1016. Objects may include a plurality of media content items and a plurality of object metadata. Objects may include educational information such as slides, music compositions, media available for shared editing, and the like. Objects may comprise a combination of media. A combination of media may be played back simultaneously from a single object. A display device having more than object may have simultaneous playback from more than one object at a time. Objects may include instructions (or program code) 1016 that may be stored in the memory of the display device and executed by the processor of the display device. Objects may have program code 1016 that describes their functioning at a display device, for example, the program code may enable an interactive test to be sent from one display device to another. Object may have program code 1016 that causes specific interactions to occur when it is displayed in conjunction with another type of object at a display device.

Media may include any of text content (not shown), video content 1002, image content 1006, audio content 1004, animated content, music notation content, educational content (for instance a quiz) or any other content. The media content may be stored in an object in different forms including binary data representations, vector based representations, or any other data storage representation. The media of an object may be stored in an instance of the object, or may be referred to by reference to a remote server. Where the media may be a reference to a remote server, content may be streamed from the server.

An object may have a reference to one or more other objects (not shown), and by the reference to other objects may be linked together. This linking of objects may allow for changes made on one display device to be applied synchronously across a plurality of display devices. An object may also have a reference to one or more display devices, which may allow for the delivery of content, for instance video content, to be played back synchronously on the plurality of display devices. Audio and video content may be streamed from a linked object to another linked object.

Referring to FIG. 10B, which illustrates a serialized representation 1050 of an object. The serialized representation 1050 may be in the form of JSON (shown), YAML, XML, or any suitable markup language. The serialized representation may include binary data representations, for instance of the video content, image content or audio content. The serialized example in 1050 shows a variety of metadata, audience criteria, state, and content. The serialized representation is readable by the second display device when the object is transferred such that the object may be programmatically materialized such that the object state is preserved between the first and second display devices.

Figure 11A:
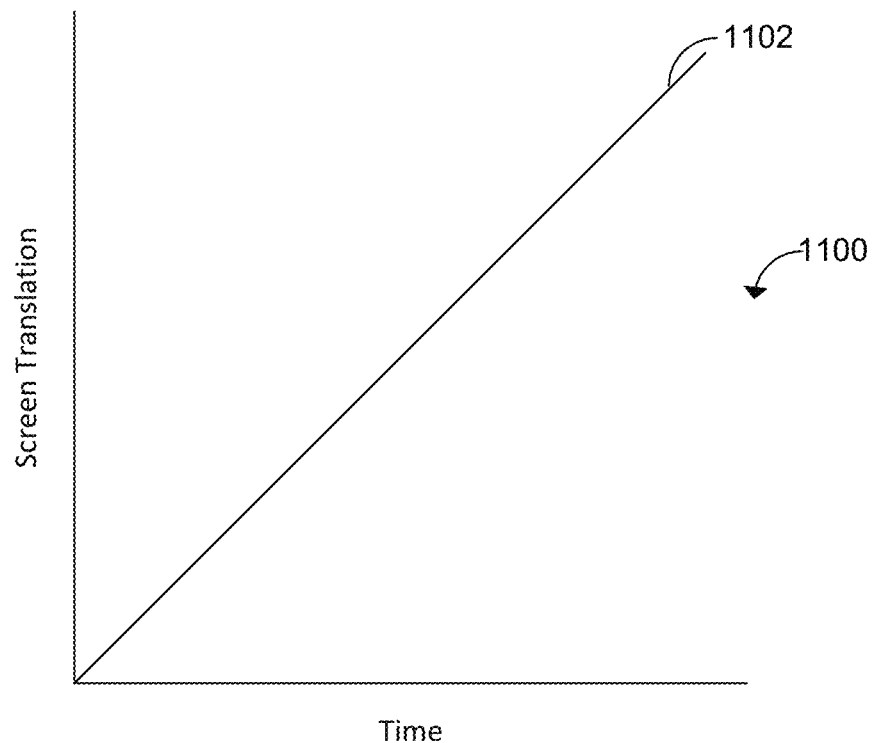
FIG. 11A is a graph representation of an object translation on the screen of a display device in accordance with an example embodiment.
Figure 11B:
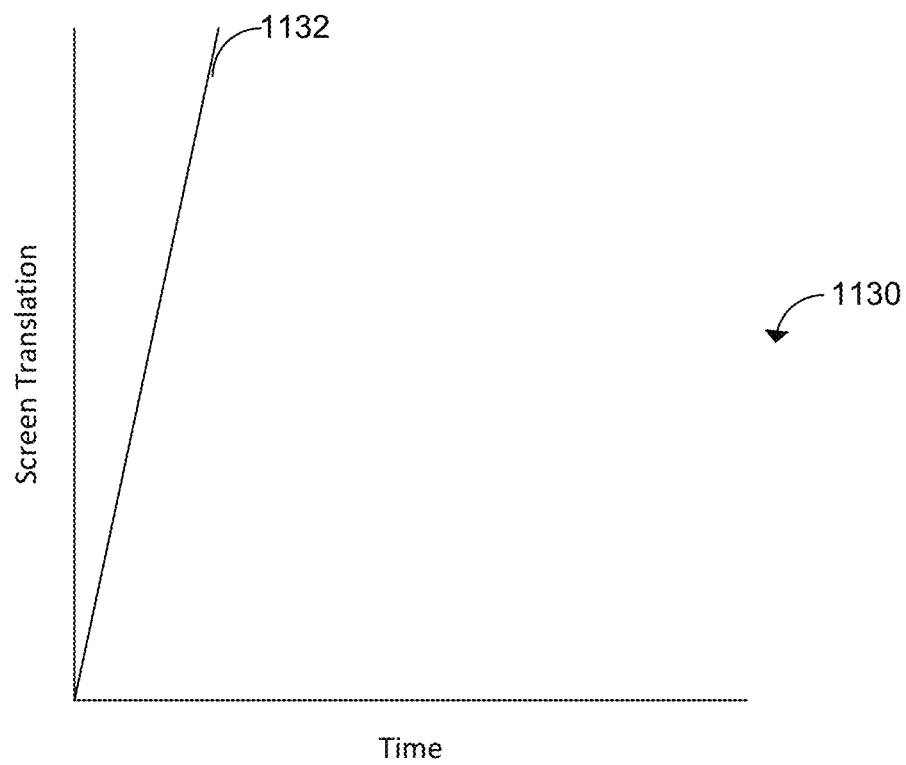
FIG. 11B is a graph representation of an object translation based on a velocity of user input on the screen of a display device in accordance with an example embodiment.
Figure 11C:
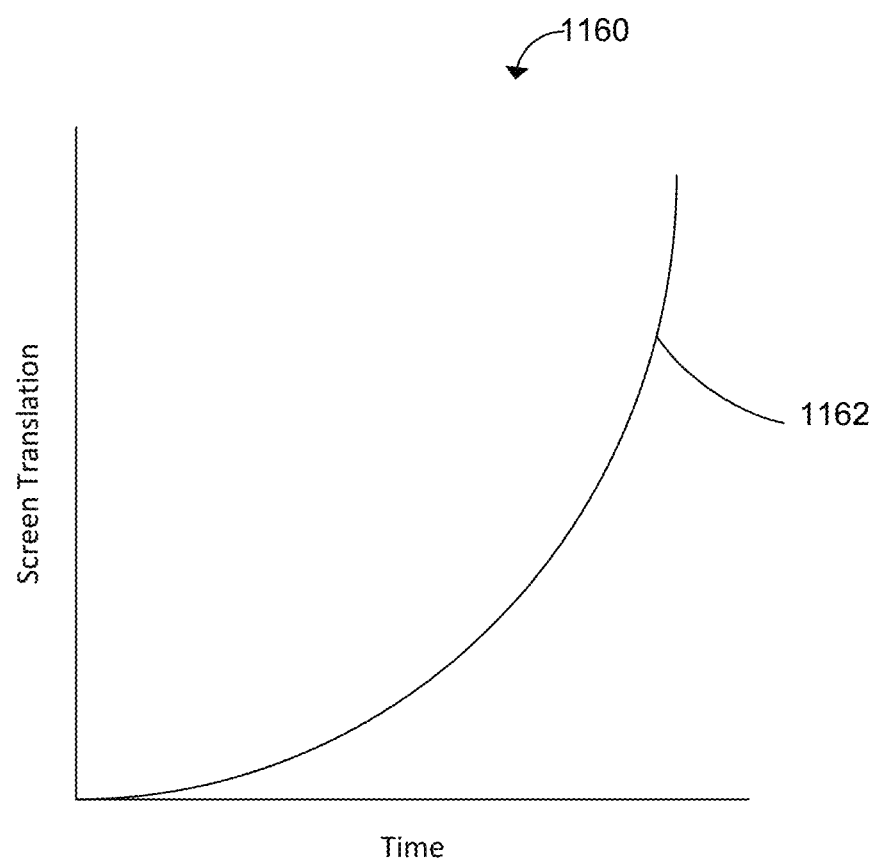
FIG. 11C is a graph representation of an object translation based on an acceleration of user input on the screen of a display device in accordance with an example embodiment.

Referring to FIGS. 11A-11C which illustrate graph representations of an object translation 1100, 1130, 1160 on the screen of a display device. In FIG. 11A, the object may translate on the screen at a fixed and constant velocity not determined by the user input. In FIG. 11B the object may translate on the screen at a constant velocity determined based on user input. It is observed that the slope of FIG. 11B is higher. In FIG. 11C, the object may translate on the screen at an increasing velocity determined based on the acceleration of user input.

Figure 12:
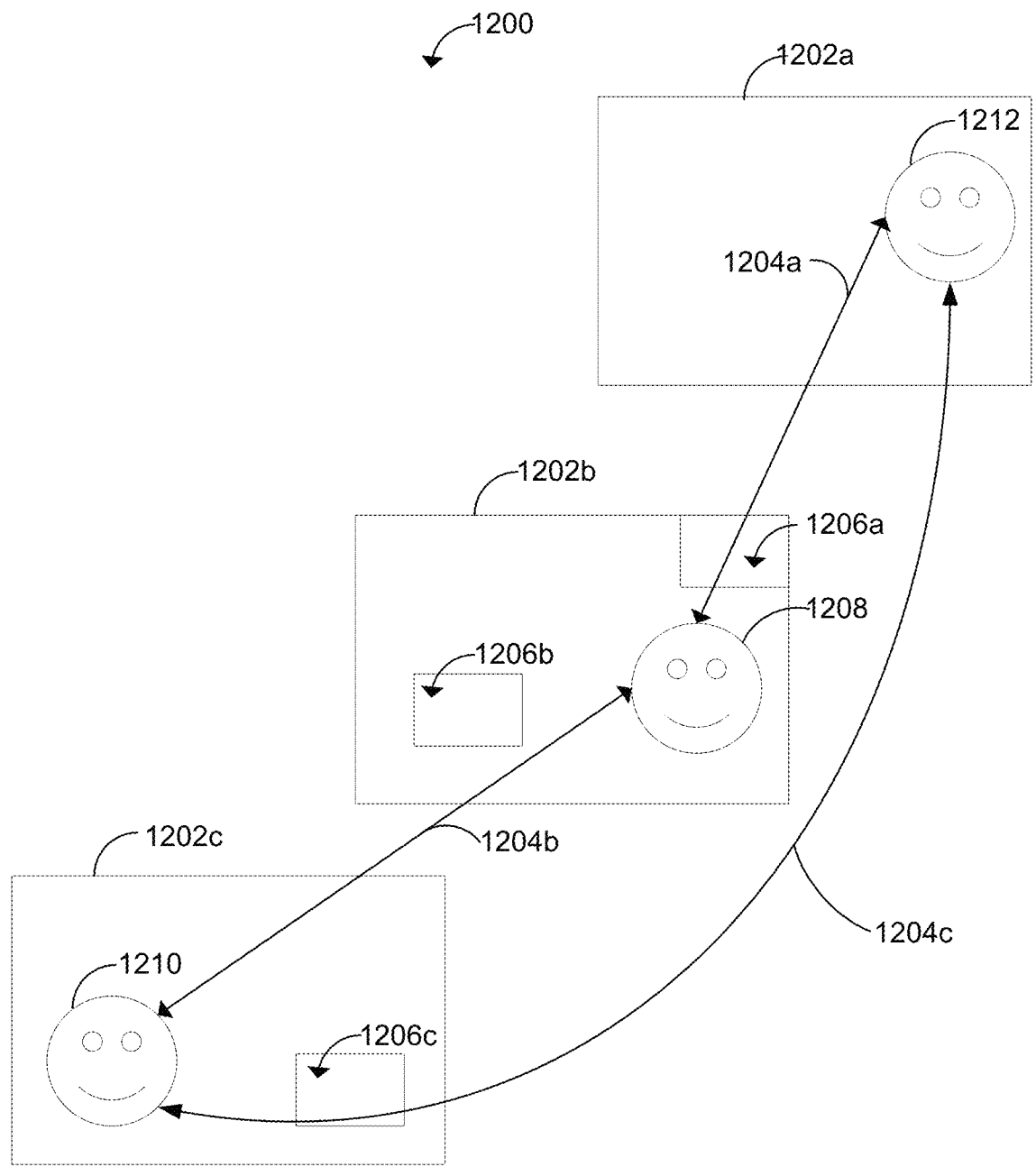
FIG. 12 is a user interface with a plurality of associated objects in accordance with an example embodiment.

Referring to FIG. 12, which illustrates a user interface 1200 with a plurality of associated objects 1208, 1210, and 1212. These objects may have been associated (or linked) based on a decision of a user or they may be associated automatically. Display devices 1202a, 1202b and 1202c each show a linked object. The display of objects 1208, 1210 and 1212 may therefore be of the same content. For example, while a smiling face is displayed in FIG. 12, the linked content may include video content, audio content, or the like and the playback on all three display devices may be substantially synchronized.

The association or linking may be performed in a decentralized way, where each object instance at each display device may have a reference to at least one other object instance on another display device. In FIG. 12, object instance 1208 has reference 1204a to object instance 1212, object instance 1212 has reference 1204c to object instance 1210 and object instance 1210 has object reference 1204b to object instance 1208. These references may be bidirectional such that an object instance maintains a list of objects that refer to itself.

Optionally the association or linking may be performed in a centralized way by a server, and the references or associations may be created, read, updated or destroyed using an API on the server.

Figure 13:
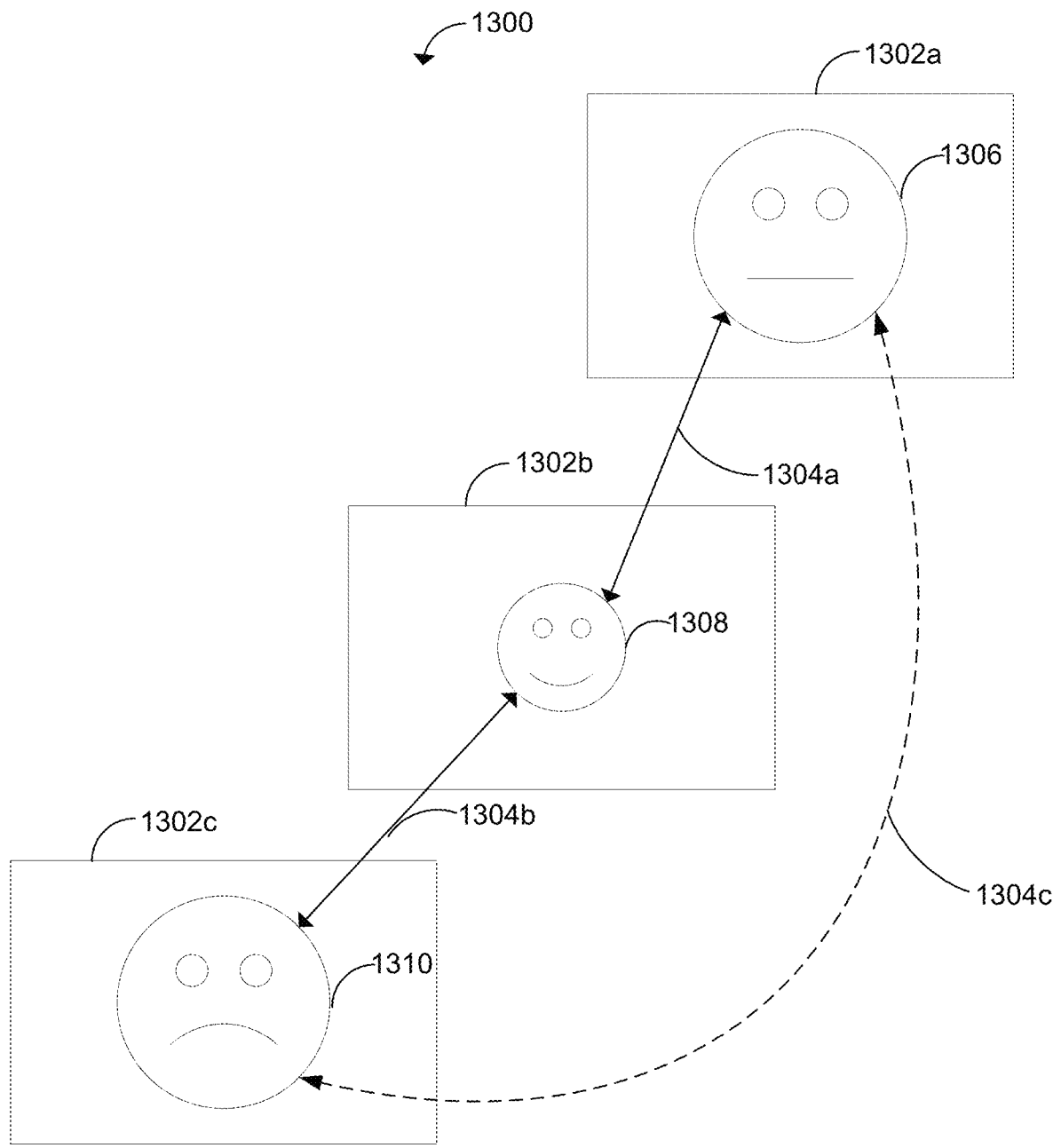
FIG. 13 is a user interface with a plurality of associated objects having distinct audience content in accordance with an example embodiment.

Referring to FIG. 13, which illustrates a user interface with a plurality of associated objects 1300 having distinct audience content. The first display device 1302a shows a first object 1306, the second display device 1302b shows a second object 1308, and the third display device 1302c shows a third object 1310. Objects 1306, 1308 and 1310 may be associated or linked with each other. The first display device 1302a may have an associated first audience profile based on demographic information such as age, education level, geographic location, etc. Similarly, display device 1302b and 1302c each may have a second audience profile and a third audience profile respectfully, the first, second and third audience profiles each being unique. Object 1306 is responsive to the audience profile of display device 1302a, and displays content based on the first audience profile. Object 1308 is responsive to the audience profile of display device 1302b, and displays content based on the second audience profile. Object 1310 is responsive to the audience profile of display device 1302c, and displays content based on the third audience profile. The audience criteria of an object may describe the content to be displayed for a given audience profile on a display device.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers (referred to below as computing devices) may be a server, network appliance, embedded device, computer expansion module, a personal computer, laptop, personal data assistant, cellular telephone, smart-phone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloads, magnetic and electronic storage media, digital and analog signals, and the like. The computer useable instructions may also be in various forms, including compiled and non-compiled code.

Various embodiments have been described herein by way of example only. Various modification and variations may be made to these example embodiments without departing from the spirit and scope of the invention, which is limited only by the appended claims. Also, in the various user interfaces illustrated in the figures, it will be understood that the illustrated user interface text and controls are provided as examples only and are not meant to be limiting. Other suitable user interface elements may be possible.

I claim:

1. A method for multi-display interaction comprising:
   providing a plurality of display devices comprising:
   a display,
   an input device,
   a processor, and
   a memory;

showing an object on a first display associated with a first display device;
receiving an input gesture beginning at a first point on the object and finishing at a second point;
determining a selection line between the first point and the second point;
determining a projection line based on the selection line;
translating the object along the projection line and
if the object intersects a first active region in a plurality of active regions, associating the object with a second display device corresponding to the first active region and showing the object on the second display.

2. The method of claim 1 further comprising:
determining an input velocity vector between the first point and a second point and translating the object based on the input velocity vector.

3. The method of claim 2 further comprising:
determining an input acceleration vector between the first point and a second point and translating the object based on the input acceleration vector.

4. The method of claim 3 further comprising:
determining an object momentum at the second point based on an object mass and velocity;
translating the object along the projection line at the object momentum and decreasing the object momentum as the object translates.

5. The method of claim 4 wherein
each display device further comprises an audio device;
the object comprises an audio content and a video content; and
the showing the object further comprises
showing the video content on the display device, and
playing the audio content on the audio device.

6. The method of claim 5 further comprising
modifying the object associated with a first display device.

7. The method of claim 5 further comprising
modifying the object associated with a second display device;
receiving an second input gesture beginning at a third point on the object and finishing at a fourth point;
determining a second selection line between the third point and the fourth point;
determining a second projection line based on the second selection line;
translating the object along the second projection line;
if the object intersects a second active region in a plurality of active regions, associating the object with the first display device corresponding to the second active region and showing the object on the first display.

8. The method of claim 5 further comprising
an interaction field associated with the object comprising a plurality of options;
receiving a second input gesture corresponding to a selection in the plurality of options;
modifying the interaction field based on the selection; and
associating the object with the first display device.

9. The method of claim 7 wherein
the first display device comprises a first audience information,
the second display device comprises a second audience information,
the object comprises a first audience content and a second audience content,
the showing the object further comprises
showing the first audience content on the first display based on the first audience information;
showing the second audience content on the second display based on the second audience information.

10. A multi-screen interaction system comprising:
an object;
a plurality of display devices, each display device comprising:
a memory storing the object,
a display,
a processor, and
an input device that receives an input gesture;
wherein
a display of a first display device shows the object,
the processor of a first display device is configured to:
receive a plurality of points from the input device corresponding to gesture at a point on the display:
a first point in the plurality of points corresponding to an initiation of a gesture,
a second point in the plurality of points corresponding to an completion of a gesture,
determine a selection vector formed from the first point to the second point,
determine a projection vector based on the selection vector,
translate the object along the projection vector;
determine if the object intersects a first active region in a plurality of active regions, and if so, send the object to a second display device corresponding to the first active region;
the processor of a second display device is configured to:
receive the object from the first display device; and
store the object in the memory of the second display device; and
instruct the display of the second display device to show the object.

11. The system of claim 10 further comprising:
each of the plurality of display devices further comprising an audio device;
the object further comprising a video content and an audio content;
the processor of each of the plurality of display devices further configured to:
show the video content on the display;
play the audio content on the audio device.

12. The system of claim 11 further comprising:
the processor of a first display device in the plurality of display devices further configured to:
modify the object.

13. The system of claim 12 further comprising:
the processor of a second display device in the plurality of display devices further configured to:
modify the object.

14. The system of claim 13 further comprising:
the processor of a second display device in the plurality of display devices further configured to:
send the object to the first display device;
the processor of a first display device in the plurality of display devices further configured to:
receive the object from the second display device.

15. A method of transferring an object from a first display device to a second display device of a multi-screen interaction system comprising:
providing a first display device and a second display device;
showing an object on the first display device;
receiving an input gesture comprising a series of points;

determining a selection vector based on the series of points;
determining a projection vector of the selection vector;
translating the object on the first display device based on the projection vector;
detecting an intersection of the object with a first active region on the first display device;
transferring the object from the first display device to the second display device associated with the first active region.

16. The method of claim 15 wherein the projection vector further comprises an input velocity vector and the determining a projection vector based on the translation vector further comprises determining a translation velocity vector based on the selection vector.

17. The method of claim 16 wherein the translation vector further comprises an input acceleration vector and the determining a projection vector of the translation vector further comprises determining a translation acceleration vector based on the selection vector.

18. The method of claim 17 further comprising:
determining the momentum of the object;
translating the object based on the momentum and decreasing the object momentum as the object translates.

19. The method of claim 18 further comprising:
the object further comprising: an audio content and a video content;
the first display device and the second display device further comprising an audio device;
the showing the object further comprises showing the video content and playing the audio content on the audio device of the display device;
the transferring the object from the first display device to the second display device further comprises transferring the playing of the audio content from the first display device to the second display device.

20. The method of claim 19 further comprising:
the object further comprising a state.

21. The method of claim 20 further comprising:
the first display device and the second display device in network communications and the transferring the object from the first display device to the second display device further comprises serializing the object, transferring the serialized object to the second display device using the network communication, and materializing the object into memory at the second display device.

22. A multi-screen interaction system comprising:
a first display device comprising:
    a display,
    a processor,
    a memory,
    a user input device;
a second display device comprising
    a display,
    a processor,
    a memory,
    a user input device;
wherein
    the memory of the first display device comprises an object;
    the first display device and the second display device are in network communication;
    the object is shown on the display of the first user device;
    the processor of the first display device is operable to:
        determine a projection line based on a user input from the user input device;
        translate the object being shown on the display along the projection line;
        detect an intersection between the object and an active region;
        serialize the object;
        communicate the serialized object to the second display device using the network communication;
    the processor of the second display device is operable to:
        receive the serialized object using the network communication;
        materialize the object from the serialized object into memory.

23. The system of claim 22 wherein the processor of the first display device is further operable to:
determine an input velocity vector;
determine a translation velocity vector;
determine an input acceleration vector;
determine a translation acceleration vector;
determine an object momentum;
translate the object based on the translation velocity vector, the translation acceleration vector, and the object momentum.

24. The system of claim 23 wherein
the object further comprises an audio content and a video content;
the first display device and the second display device further comprising an audio device;
the object is shown on the first display device based on the video content;
the object is played on the audio device of the first display device based on the audio content;
the serializing the object includes serializing the audio content and the video content.

25. The system of claim 24 wherein:
the object further comprises a state.

* * * * *